(12) United States Patent
Fujiwara (10) Patent No.: US 9,417,705 B2
(45) Date of Patent: *Aug. 16, 2016

(54) MOTION DETECTION DEVICE, ELECTRONIC DEVICE, MOTION DETECTION METHOD, AND PROGRAM STORAGE MEDIUM

(71) Applicant: LAPIS Semiconductor Co., Ltd., Yokohama (JP)

(72) Inventor: Kazunori Fujiwara, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/574,212

(22) Filed: Dec. 17, 2014

(65) Prior Publication Data

US 2015/0106049 A1 Apr. 16, 2015

Related U.S. Application Data

(63) Continuation of application No. 13/284,083, filed on Oct. 28, 2011, now Pat. No. 8,942,950.

(30) Foreign Application Priority Data

Nov. 5, 2010 (JP) ................... 2010-248536

(51) Int. Cl.
*G01P 15/18* (2013.01)
*G06F 3/01* (2006.01)
*G06F 3/0346* (2013.01)

(52) U.S. Cl.
CPC ............... *G06F 3/017* (2013.01); *G01P 15/18* (2013.01); *G06F 3/0346* (2013.01)

(58) Field of Classification Search
CPC .................................................... G01P 15/18
USPC ............................................... 702/141
See application file for complete search history.

(56) References Cited

U.S. PATENT DOCUMENTS

| 8,589,113 | B2 | 11/2013 | Fujiwara |
| 8,793,098 | B2 | 7/2014 | Fujiwara |
| 8,942,950 | B2 * | 1/2015 | Fujiwara ................. G01P 15/18 702/141 |
| 2009/0307633 | A1 * | 12/2009 | Haughay, Jr. ......... G06F 1/1626 715/841 |
| 2011/0208472 | A1 | 8/2011 | Fujiwara |

FOREIGN PATENT DOCUMENTS

| JP | 2009-245176 A | 10/2009 |
| JP | 2010-123040 A | 6/2010 |

* cited by examiner

*Primary Examiner* — Bryan Bui
(74) *Attorney, Agent, or Firm* — Studebaker & Brackett PC (57) ABSTRACT

A motion detection device includes: an acceleration detection unit, a separating unit, a gravity axis determination unit, and a motion detection unit. The acceleration detection unit detects acceleration components of each axis of a three-dimensional rectangular coordinate system of acceleration acting on the acceleration detection unit and outputs sets of acceleration component data. The separating unit separates the outputted sets of acceleration component data into stationary components and motion components. The gravity axis determination unit determines an axis whose separated stationary component is the largest to be a gravity axis. The motion detection unit detects, if an axis corresponding to a largest motion component showing a largest value of the separated motion components is an axis other than the determined gravity axis, a motion axis of the acceleration detection unit on the basis of the largest motion component.

19 Claims, 12 Drawing Sheets

HELD HORIZONTALLY

MOTION DETECTION DEVICE, ELECTRONIC DEVICE, MOTION DETECTION METHOD, AND PROGRAM STORAGE MEDIUM

CROSS-REFERENCE TO RELATED APPLICATION

This application is based on and claims priority under 35 USC 119 from Japanese Patent Application No. 2010-248536 filed on Nov. 5, 2010, the disclosure of which is incorporated by reference herein.

BACKGROUND

1. Technical Field

The present invention pertains to a motion detection device, an electronic device, a motion detection method, and a program storage medium, and particularly relates to a motion detection device, an electronic device, a motion detection method, and a program storage medium that use a triaxial acceleration sensor to detect motion.

2. Related Art

Conventionally, a motion recognition device that recognizes motion accompanying operations intended by a user has been proposed (e.g., see Japanese Patent Application Laid-Open (JP-A) No. 2009-245176). In this motion recognition device, it is necessary to ensure that the device does not recognize as motion unintended vibration such as when the user boards a means of transportation, walks, runs, and so forth. Therefore, the motion recognition device described in JP-A No. 2009-245176 detects an axial direction in which there is the potential for the motion recognition device to be moving in accompaniment with an operation intended by the user on the basis of feature points of acceleration in each axial direction and detects and analyzes a feature amount of acceleration in that axial direction to thereby verify whether or not the motion in the detected axial direction is motion accompanying an operation intended by the user.

Further, a gravity axis determination device that determines one of three axes configuring a three-dimensional space to be the gravity axis has been proposed (e.g., see JP-A No. 2010-123040). This gravity axis determination device generates at least two axis acceleration signals, each of which indicates acceleration in directions of at least two axes of three axes, fetches each of the axis acceleration signals as at least two axis acceleration data strings, compares data values of the axis acceleration data strings in the same time slot, and determines any one of the three axes to be the gravity axis.

However, the technology described in JP-A No. 2009-245176 performs the complicated processing of detecting and analyzing the feature amount of acceleration in order to recognize motion, and the processing is cumbersome.

Further, the technology described in JP-A No. 2010-123040 determines the gravity axis in a case where the device is in a stationary state, but in a case in which motion such as shaking the device is applied as motion inputting (input operations by applying motion to the device), the acceleration data other than in the gravity axis also become greater, so the technology cannot accurately determine the gravity axis.

SUMMARY

The present invention has been made in consideration of the above situation and provides a motion detection device, an electronic device, a motion detection method, and a program storage medium that can reduce misdeterminations resulting from unintended motion and so forth and can accurately detect, by simple processing, in whichever axial direction the motion detection device has moved.

A first aspect of the invention is a motion detection device including: an acceleration detection unit that detects acceleration components of each axis of a three-dimensional rectangular coordinate system of acceleration acting on the acceleration detection unit and outputs sets of acceleration component data; a separating unit that separates the outputted sets of acceleration component data into stationary components obtained by subjecting the outputted sets of acceleration component data to low-pass filter processing and motion components obtained by subtracting the stationary components from the sets of acceleration component data; a gravity axis determination unit that determines an axis whose separated stationary component is the largest to be a gravity axis; and a motion detection unit which, in a case in which an axis corresponding to a largest motion component showing a largest value of the separated motion components is an axis other than the determined gravity axis, detects a motion axis of the acceleration detection unit on the basis of the largest motion component.

A second aspect of the invention is an electronic device including the motion detection device of the first aspect of the invention.

The motion detection device can be applied to electronic devices such as mobile telephones and game console controllers, for example.

A third aspect of the invention is a motion detection method including: detecting by an acceleration detection unit acceleration components of each axis of a three-dimensional rectangular coordinate system of acceleration acting on the acceleration detection unit and outputting sets of acceleration component data; separating the outputted sets of acceleration component data into stationary components obtained by subjecting the outputted sets of acceleration component data to low-pass filter processing and motion components obtained by subtracting the stationary components from the sets of acceleration component data; determining an axis whose separated stationary component is the largest to be a gravity axis; and in a case in which an axis corresponding to a largest motion component shoring a largest value of the separated motion components is an axis other than the gravity axis, detecting a motion axis of the acceleration detection unit on the basis of the largest motion component.

A fourth aspect of the invention is a non-transitory storage medium storing a program causing a computer to execute motion detection processing, the motion detection processing including: detecting by an acceleration detection unit acceleration components of each axis of a three-dimensional rectangular coordinate system of acceleration acting on the acceleration detection unit and outputting sets of acceleration component data; separating the outputted sets of acceleration component data into stationary components obtained by subjecting the outputted sets of acceleration component data to low-pass filter processing and motion components obtained by subtracting the stationary components from the sets of acceleration component data; determining an axis whose separated stationary component is the largest to be a gravity axis; and in a case in which an axis corresponding to a largest motion component shoring a largest value of the separated motion components is an axis other than the gravity axis, detecting a motion axis of the acceleration detection unit on the basis of the largest motion component.

Each of the above-described aspects separates the sets of the acceleration component data into the stationary components and the motion components, determines as the gravity axis the axis whose stationary component is the largest, and detects in which axial direction of the axes the acceleration detection unit has moved (i.e., the motion axis of the acceleration detection unit) in a case in which the motion component showing the largest value (the largest motion component) corresponds to an axis other than the gravity axis. Thereby, misdeterminations resulting from unintended vibration and the like can be reduced, and the motion axis of the acceleration detection unit can be accurately detected by simple processing.

BRIEF DESCRIPTION OF THE DRAWINGS

An exemplary embodiment of the present invention will be described in detail based on the following figures, wherein.

DETAILED DESCRIPTION

Figure 1:
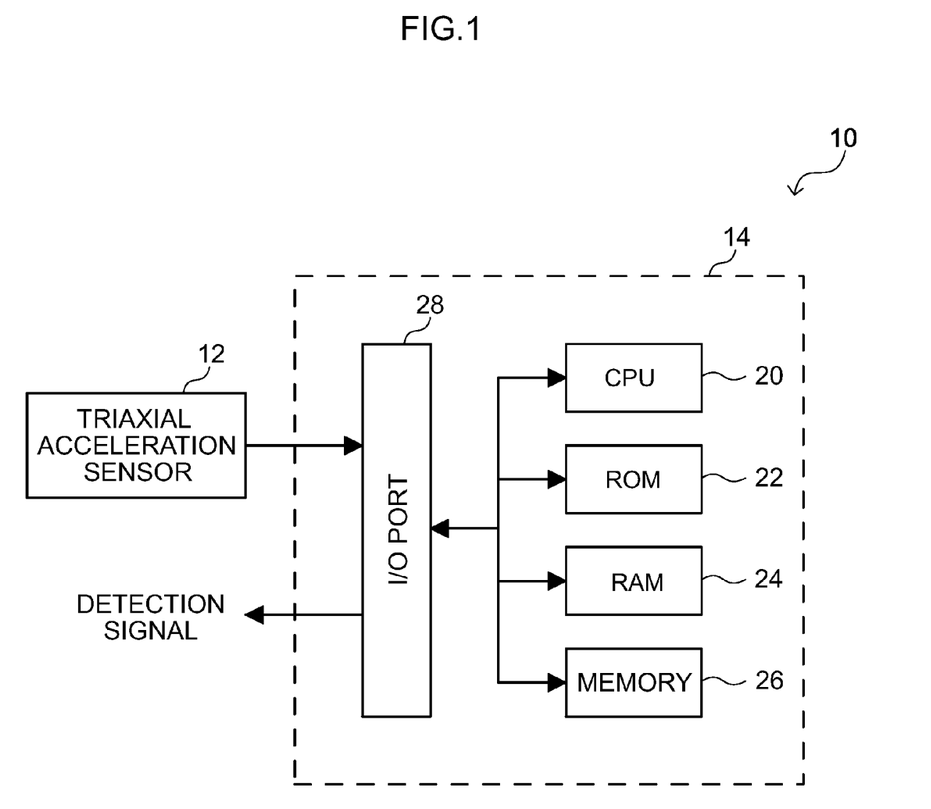
FIG. 1 is a block diagram showing the configuration of a motion detection device of the exemplary embodiment.

As shown in FIG. 1, a motion detection device 10 of an exemplary embodiment of the present invention is equipped with a triaxial acceleration sensor 12 and a microcomputer 14. The triaxial acceleration sensor 12 detects acceleration components in each axial direction of an X-axis, a Y-axis, and a Z-axis of a rectangular coordinate system and outputs acceleration component data. The microcomputer 14 detects in which axial direction the motion detection device 10 has moved (i.e., the motion axis of the motion detection device 10) and outputs a detection signal corresponding to the detected axial direction.

Figure 2:
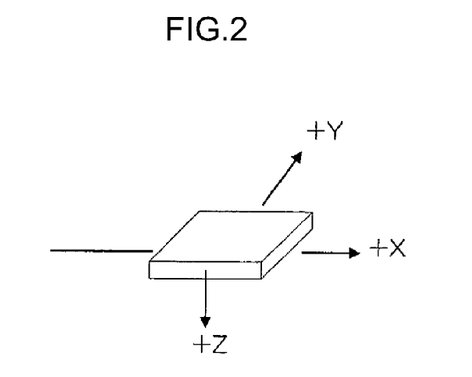
FIG. 2 is an external perspective view showing a triaxial acceleration sensor that is used in the motion detection device of the exemplary embodiment.

The triaxial acceleration sensor 12 detects acceleration components in each axial direction of an X-axis, a Y-axis, and a Z-axis of a rectangular coordinate system such as shown in FIG. 2 and outputs acceleration component data. The acceleration component data (value) express the direction of the acceleration component with the sign (positive (+) or negative (−)) thereof and express the magnitude of the acceleration component with the absolute value thereof. The directions of the acceleration components are defined in such a way that, on the X-axis in FIG. 2, the right direction is positive and the left direction is negative. On the Y-axis, the direction heading into the background is positive and the direction heading into the foreground is negative. On the Z-axis, the down direction is positive and the up direction is negative. Thereby, the triaxial acceleration sensor 12 can detect acceleration components in six directions: the positive direction on the X-axis, the negative direction on the X-axis, the positive direction on the Y-axis, the negative direction on the Y-axis, the positive direction on the Z-axis, and the negative direction on the Z-axis.

Further, in a case in which the triaxial acceleration sensor 12 is in a stationary state in the orientation shown in FIG. 2, the triaxial acceleration sensor 12 outputs acceleration component data of "0 g" in regard to the X-axis and the Y-axis and outputs acceleration component data of "+1 g" in regard to the Z-axis. Here, "g" is gravitational acceleration, which represents the unit of the acceleration component data.

The microcomputer 14 includes a CPU 20 that controls the entire motion detection device 10, a ROM 22 that serves as a storage medium in which various types of programs such as a later-described motion detection program are stored, a RAM 24 that temporarily stores data as a work area, a memory 26 that serves as a storage unit in which various types of information (data) are stored, an input/output (I/O) port 28, and a bus that interconnects these components. The triaxial acceleration sensor 12 is connected to the I/O port 28.

Next, the operations of the motion detection device 10 of the present exemplary embodiment will be described. In the present exemplary embodiment, in a case in which the motion detection device 10 has been shaken along whichever axial direction, the motion detection device 10 detects in which axial direction it has been shaken (the motion axis). In the present exemplary embodiment, shaking action of the motion detection device 10 in any axial direction of the triaxial acceleration sensor 12 will be called "shaking".

Figure 3:
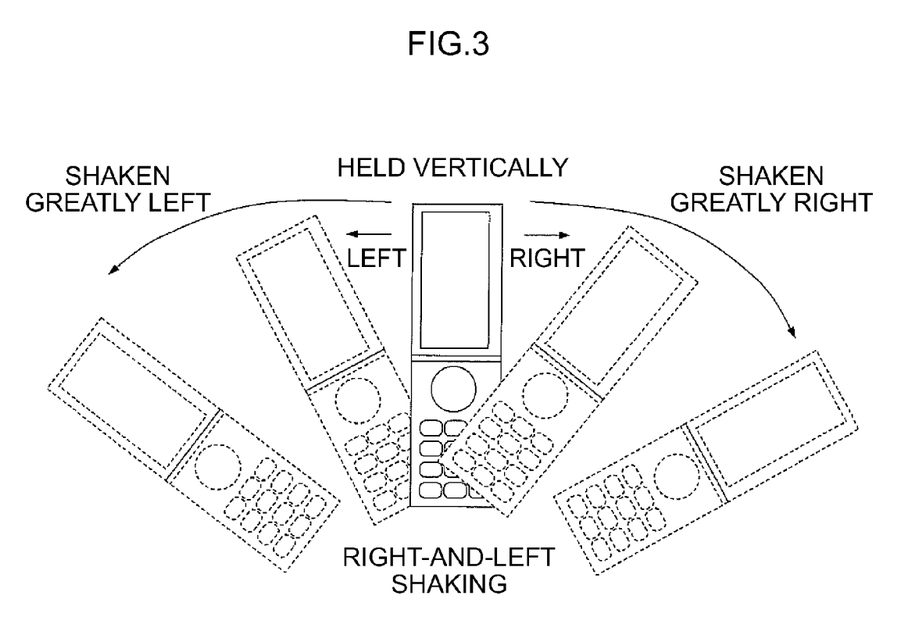
FIG. 3 is a diagram for describing shaking in a right-and-left direction in a case in which a mobile telephone equipped with the motion detection device of the exemplary embodiment is held vertically.
Figure 4:
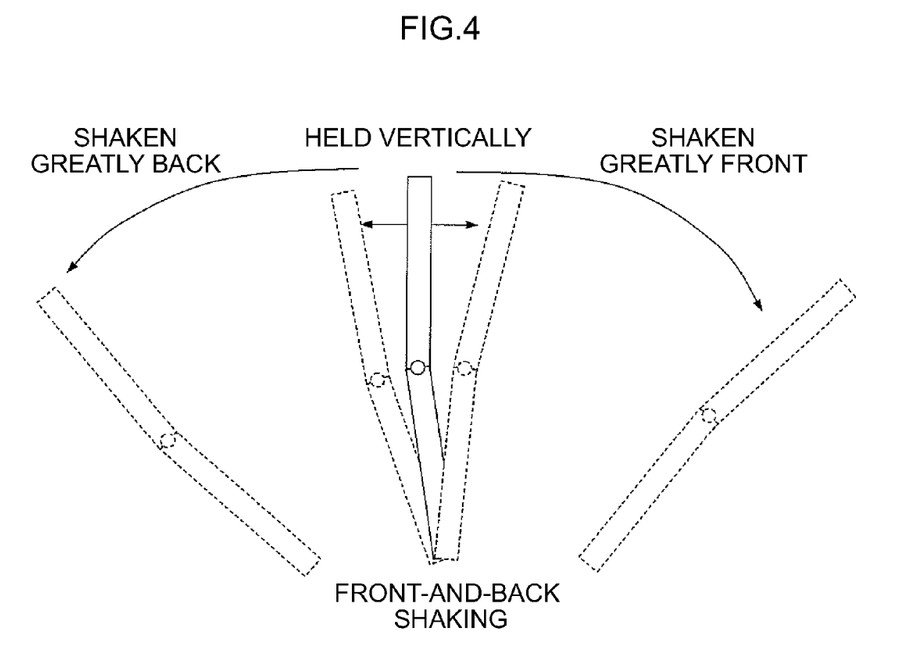
FIG. 4 is a diagram for describing shaking in a front-and-back direction in a case in which the mobile telephone equipped with the motion detection device of the exemplary embodiment is held vertically.
Figure 5:
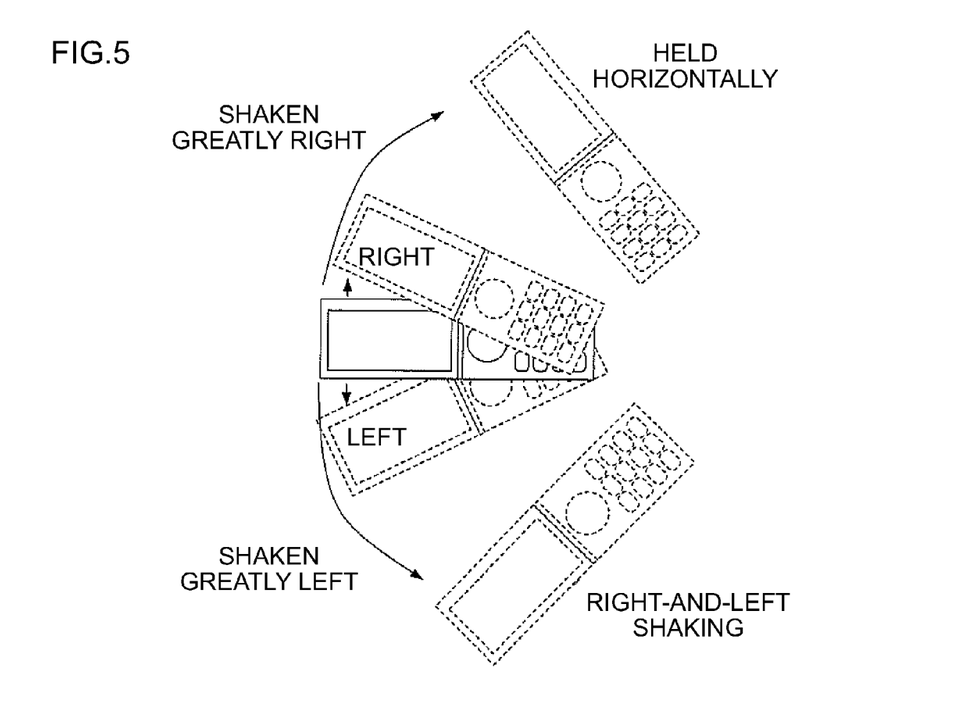
FIG. 5 is a diagram for describing shaking in the right-and-left direction in a case in which the mobile telephone equipped with the motion detection device of the exemplary embodiment is held horizontally.
Figure 6:
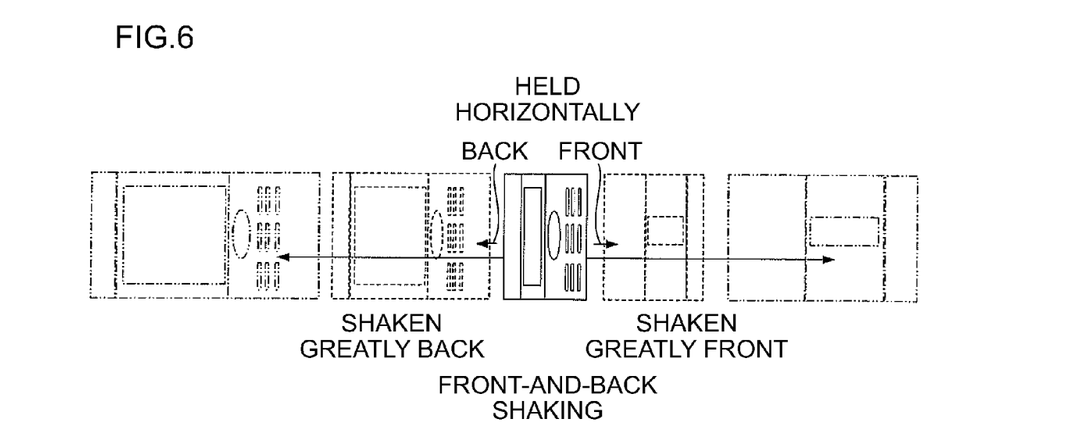
FIG. 6 is a diagram for describing shaking in the front-and-back direction in a case in which the mobile telephone equipped with the motion detection device of the exemplary embodiment is held horizontally.
Figure 7:
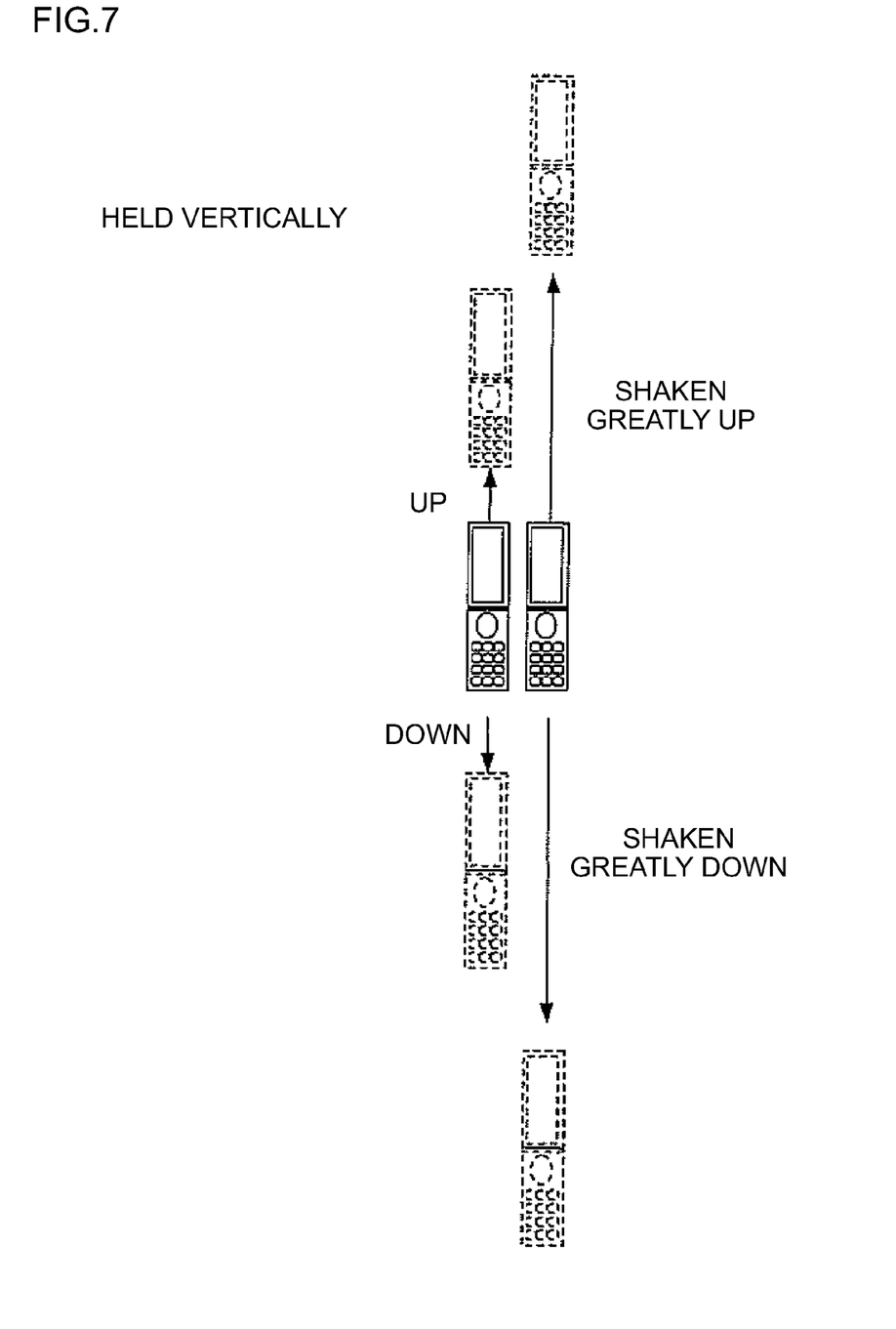
FIG. 7 is a diagram for describing shaking in a lengthwise direction in a case in which the mobile telephone equipped with the motion detection device of the exemplary embodiment is held vertically.
Figure 8:
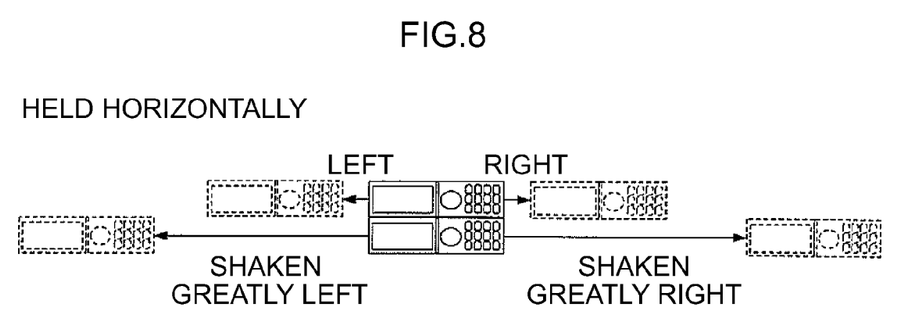
FIG. 8 is a diagram for describing shaking in the lengthwise direction in a case in which the mobile telephone equipped with the motion detection device of the exemplary embodiment is held horizontally.

Shaking using a mobile telephone equipped with the motion detection device 10 of the present exemplary embodiment will be described with reference to FIG. 3 to FIG. 8. FIG. 3 shows shaking in a right-and-left direction in a case in which the mobile telephone is held in a vertical direction (held vertically). FIG. 4 shows shaking in a front-and-back direction in a case in which the mobile telephone is held vertically. FIG. 5 shows shaking in the right-and-left direction in a case in which the mobile telephone is held in a horizontal direction (held horizontally). FIG. 6 shows shaking in the front-and-back direction in a case in which the mobile telephone is held horizontally. FIG. 7 shows shaking in a lengthwise (vertical) direction in a case where the mobile telephone is held vertically. FIG. 8 shows shaking in the lengthwise (vertical) direction in a case in which the mobile telephone is held horizontally.

Next, a motion detection routine in the motion detection device 10 of the present exemplary embodiment will be described with reference to FIG. 9. This routine is performed as a result of the CPU 20 executing the motion detection program stored in the ROM 22.

In step 100, the CPU 20 executes acceleration separation processing that separates the acceleration component data into stationary components and motion components. Here, an acceleration separation routine will be described with reference to FIG. 10.

Figure 11:
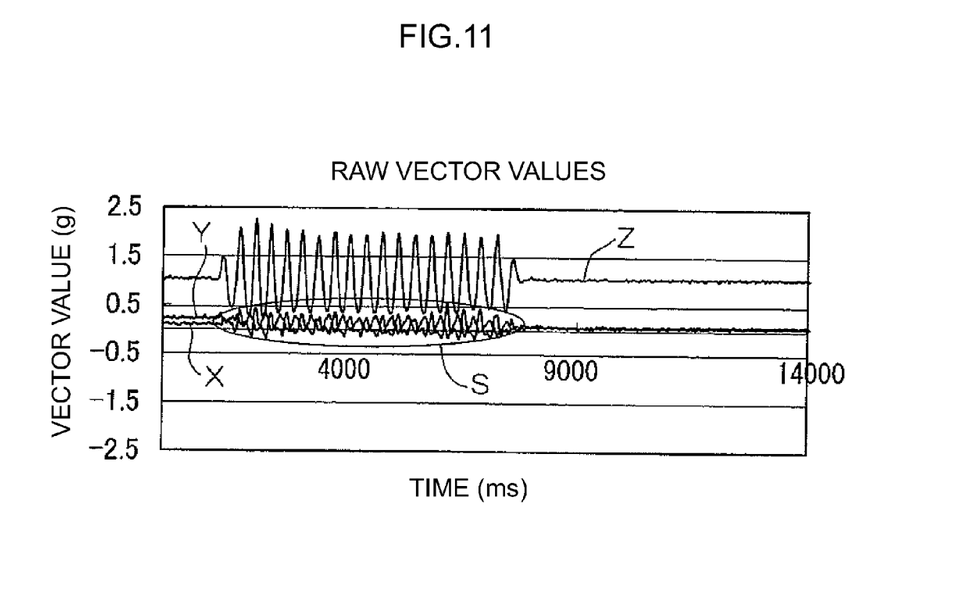
FIG. 11 is a diagram showing acceleration component data when the triaxial acceleration sensor has been shaken multiple times in the direction of gravity from a state in which the triaxial acceleration sensor has been placed horizontally.

In step 120, the CPU 20 acquires the acceleration component data in regard to each axis from the triaxial acceleration sensor 12. FIG. 11 shows an example of the acquired acceleration component data. An axial direction in which the motion detection device 10 has been shaken (the motion axis) is detected based on this data. However, in the portion indicated by S (the place that is encircled) in FIG. 11, there are multiple points where the sets of the acceleration component data of the three axes show values that are about the same, and at these points it is difficult to detect in which axial direction the motion detection device 10 has been shaken.

Figure 12:
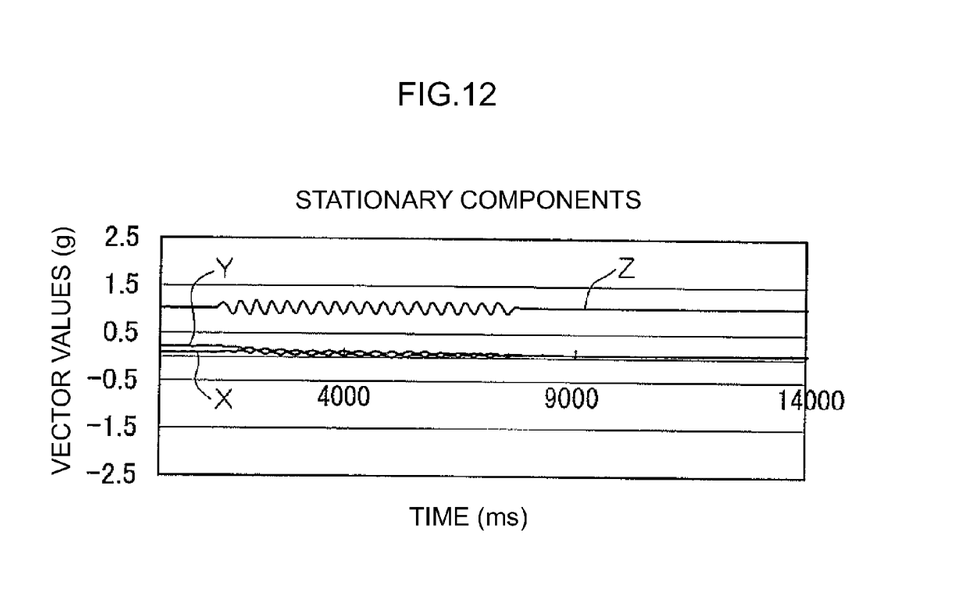
FIG. 12 is a diagram showing stationary components obtained by subjecting the acceleration component data of FIG. 11 to low-pass filter processing.

Therefore, next, the processing proceeds to step 122 and subjects the acquired sets of acceleration component data to low-pass filter processing. FIG. 12 shows the data obtained by subjecting the acquired sets of acceleration component data to the low-pass filter processing. As shown in FIG. 12, in the acceleration component data after the low-pass filter processing, the X-axis and the Y-axis, which show substantially "0 g", and the Z-axis, which shows substantially "+1 g", are completely separated. The data that have been extracted by subjecting the acquired acceleration component data to the low-pass filter processing in this way will be called "stationary components" of the acceleration component data.

Figure 13:
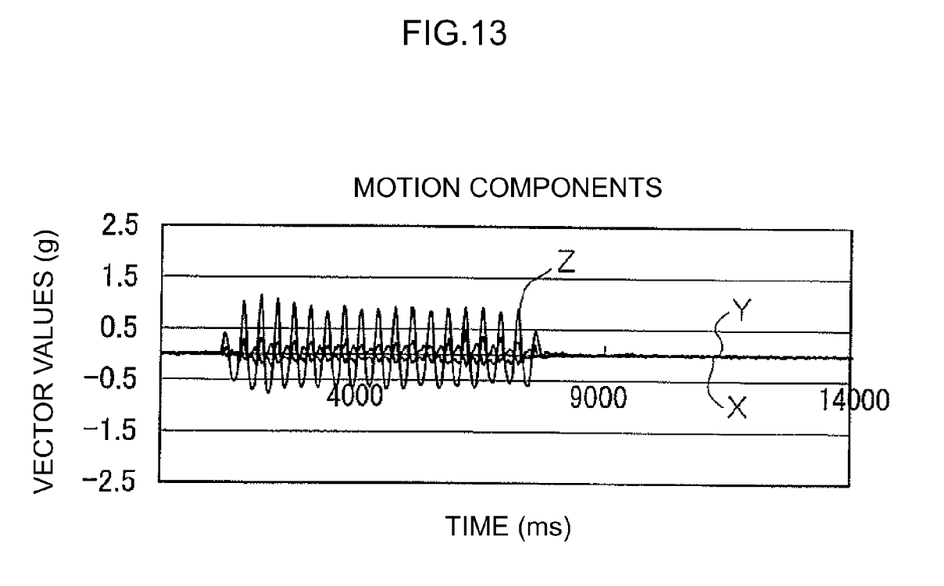
FIG. 13 is a diagram showing motion components obtained by subtracting the stationary components of FIG. 12 from the acceleration component data of FIG. 11.

Next, in step 124, the CPU 20 subtracts the data of the stationary components that were extracted in step 122 from the acceleration component data that were acquired in step 120 in regard to each of the X-axis, the Y-axis, and the Z-axis. FIG. 13 shows the data after the subtraction. The data that have been extracted by subtracting the data after the low-pass filter processing from the acquired acceleration component data in this way will be called "motion components" of the acceleration component data. This method can thus separate the acceleration component data into the stationary components and the motion components by simple processing even without performing advanced high-pass filter processing.

Figure 9:
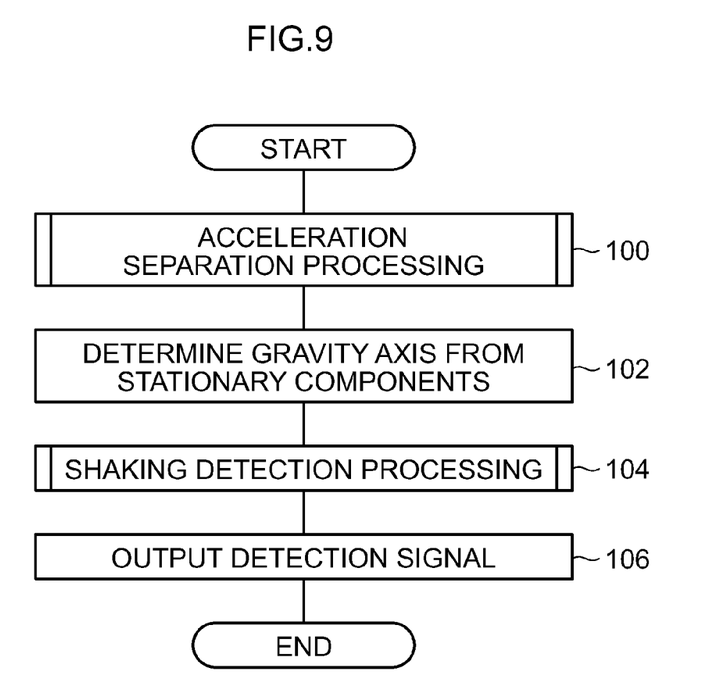
FIG. 9 is a flowchart showing the flow of a motion detection routine in the motion detection device of the exemplary embodiment.
Figure 10:
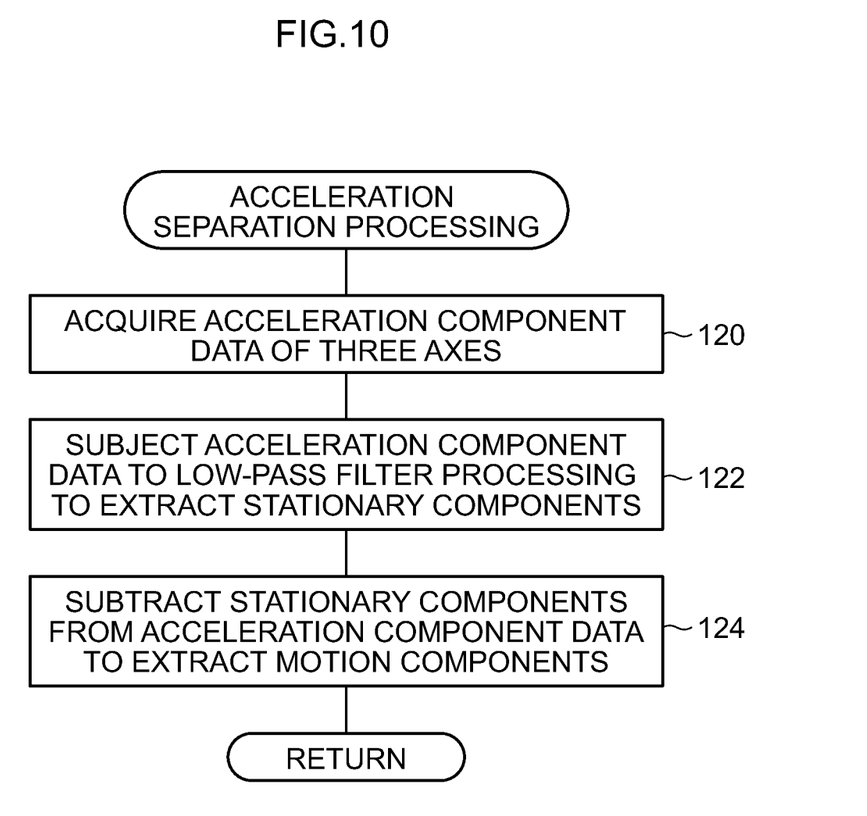
FIG. 10 is a flowchart showing the flow of an acceleration separation routine in the motion detection device of the exemplary embodiment.

Next, the processing returns to step 102 in FIG. 9 and determines the axis corresponding to the direction of gravity (called the "gravity axis" below) on the basis of the stationary components that were extracted in step 122 in the acceleration separation processing (FIG. 10). For example, in a case in which the stationary components shown in FIG. 12 have been extracted, the stationary component of the Z-axis shows "+1 g", which is the largest value, so the Z-axis is determined to be the gravity axis.

Next, in step 104, the CPU 20 executes shaking detection processing that detects shaking. Here, a shaking detection routine will be described with reference to FIG. 14.

In step 140, the CPU 20 starts observing in a time series the motion components a that were extracted in step 124 of the acceleration separation processing (FIG. 10) in regard to each of the three axes.

Figure 14:
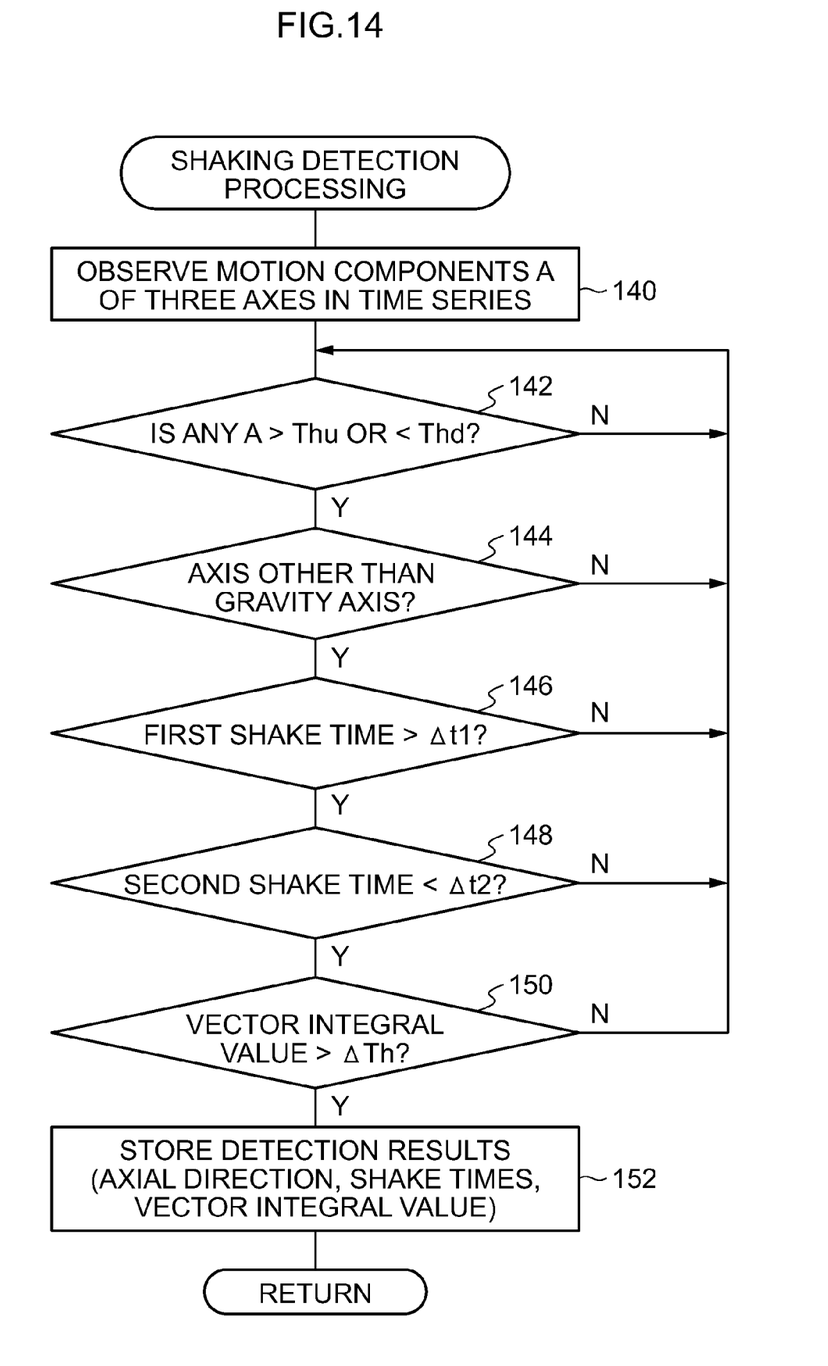
FIG. 14 is a flowchart showing the flow of a shaking detection routine in the motion detection device of the exemplary embodiment.

Next, in step 142, the CPU 20 determines whether or not the motion component A of any of the axes has exceeded a predetermined threshold value Thu in the positive direction or a predetermined threshold value Thd in the negative direction. The threshold value Thu is an upper limit value of a predetermined range, and the threshold value Thd is a lower limit value of the predetermined range. "Exceeding" the threshold value Thd means that the value of the motion component a falls below the threshold value Thd. In this regard, the waveform of a motion component resulting from shaking differs depending on, for example, the installation position in the electronic device in which the motion detection device 10 is installed. Therefore, considering the installation position and so forth, the threshold value Thu and the threshold value Thd should be configured to be able to set separately. In a case in which any one of the motion components A has exceeded either of the threshold values, the processing proceeds to step 144. In a case in which none of the motion components A has exceeded either of the threshold values, the processing repeats the determination of step 142.

In step 144, the CPU 20 determines whether or not the axis corresponding to the motion component A that was determined as having exceeded either of the threshold values (the largest motion component) in step 142 is an axis other than the gravity axis that was determined in step 102 in FIG. 9. When a user carrying a mobile telephone or the like equipped with the motion detection device 10 of the present exemplary embodiment boards a means of transportation or walks or runs, there are cases where acceleration is detected because of the vibration of the mobile telephone or the like, the motion component of any of the axes may exceed the threshold value Thu or the threshold value Thd, and unintended shaking may be detected. Therefore, in light of the fact that vibration (shaking) mainly in the direction of the gravity axis occurs when the user boards a means of transportation, walks, runs, and so forth, in a case in which the value of the motion component corresponding to the gravity axis has exceeded either of the threshold values, the CPU 20 determines that the motion results from unintended vibration and does not detect the motion as shaking. In a case in which the axis corresponding to the motion component that has exceeded either of the threshold values is an axis other than the gravity axis, the processing proceeds to step 146. In a case in which the axis corresponding to the motion component A that has exceeded either of the threshold values is the gravity axis, the processing returns to step 142 without detecting the motion as shaking and continues observing the motion components A.

Figure 15A:
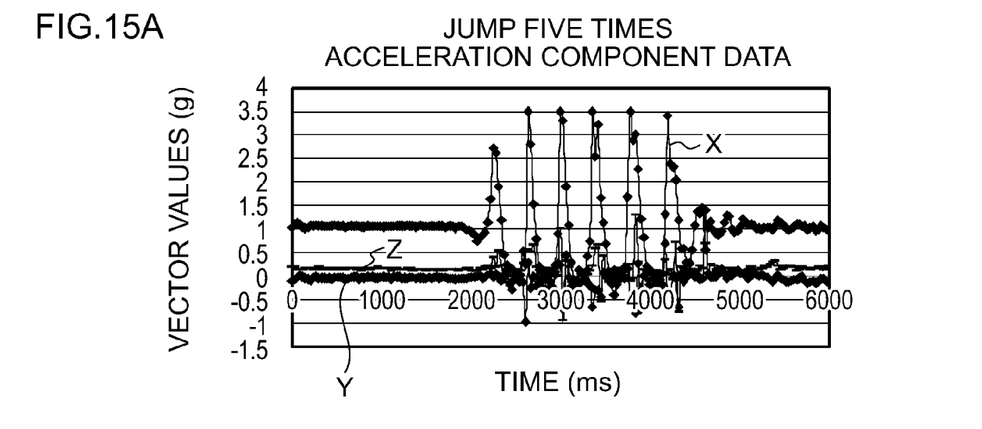
FIG. 15A is a diagram showing an example of the acceleration component data.
Figure 15B:
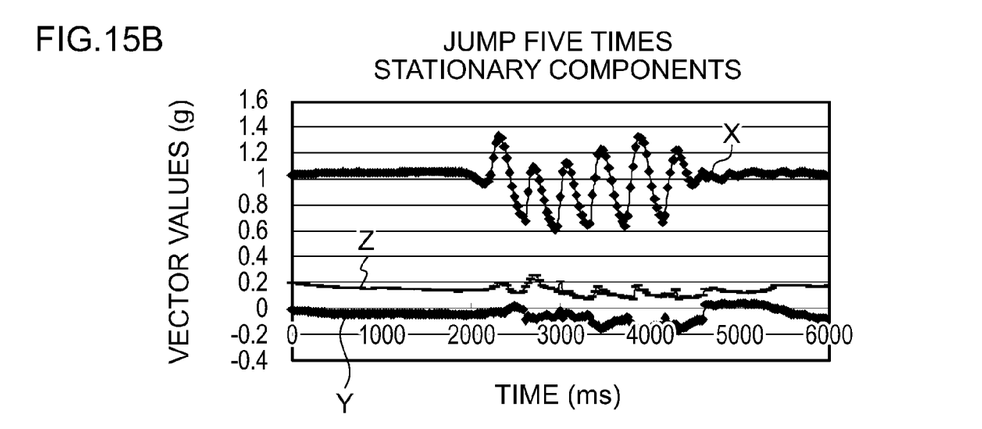
FIG. 15B is a diagram showing an example of the stationary components.
Figure 15C:
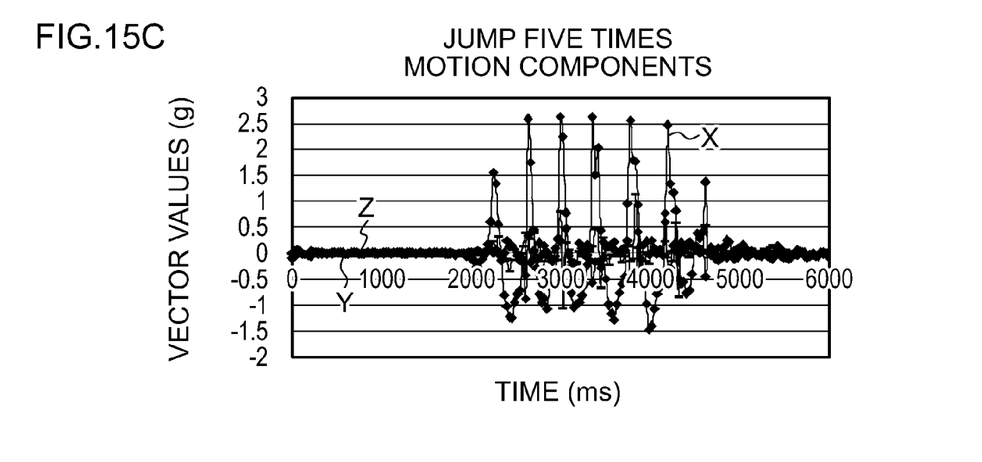
FIG. 15C is a diagram showing an example of the motion components.

For example, FIG. 15A shows the acceleration component data when the user has jumped five times with the mobile telephone or the like being placed in a chest pocket in such a way that the X-axis of the triaxial acceleration sensor 12 coincides with the direction of gravity. When the CPU 20 executes the acceleration separation processing with respect to these acceleration component data, the stationary components shown in FIG. 15B and the motion components shown in FIG. 15C are obtained. The CPU 20 can determine from these stationary components that the X-axis is the gravity axis. In this case, even if the fact that the motion component of the X-axis has exceeded either of the threshold values has been detected, the CPU 20 does not detect the motion as shaking because the X-axis is the gravity axis.

Figure 16A:
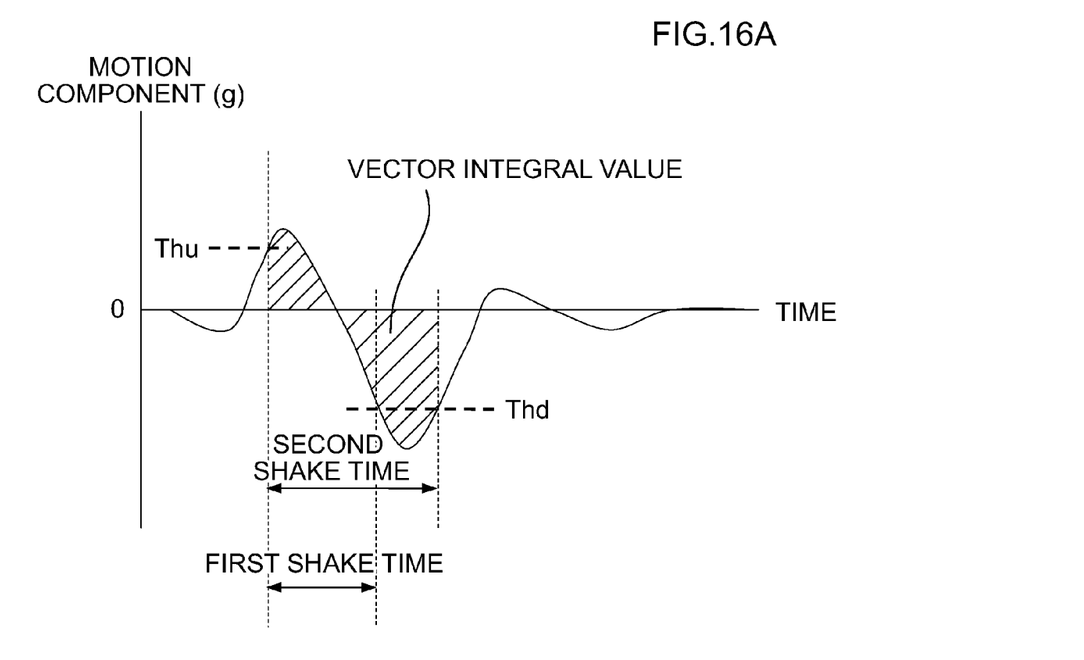
FIG. 16A is a diagram for describing the detection of shaking in the exemplary embodiment in a case in which a motion component has first exceeded a threshold value Thu.
Figure 16B:
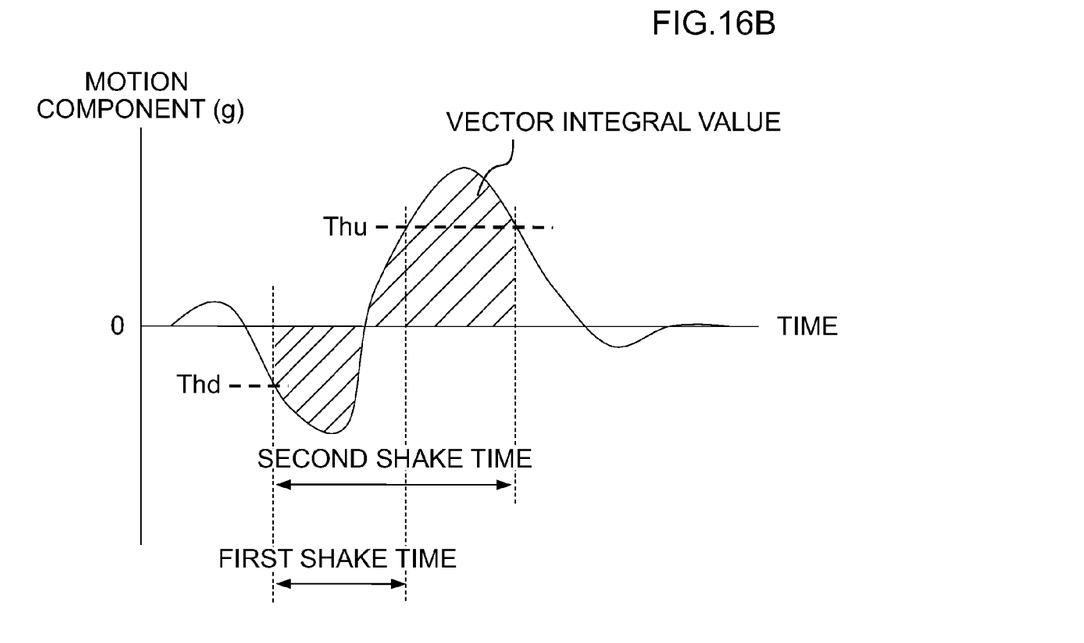
FIG. 16B is a diagram for describing the detection of shaking in the exemplary embodiment in a case in which the motion component has first become less than a threshold value Thd.

In step 146, the CPU 20 determines whether or not a first shake time (period) has exceeded a predetermined time period Δt1. In a case in which the motion component has exceeded the threshold value Thu before the threshold value Thd as shown in FIG. 16A, the first shake time is the period from the time when the motion component has exceeded the threshold value Thu until the time the motion component exceeds the threshold value Thd. In a case in which the motion component has exceeded the threshold value Thd before the threshold value Thu as shown in FIG. 16B, the first shake time is the period from the time when the motion component has exceeded the threshold value Thd until the time the motion component exceeds the threshold value Thu. Further, Δt1 represents a shake invalid time (period) which is a predetermined period for ensuring that the CPU 20 does not detect motion as shaking in a case in which the first shake time is equal to or less than Δt1 on the basis that the first shake time tends to be shorter than normal when the user boards a means of transportation, walks, runs, and so forth. In a case where the first shake time has exceeded Δt1, the CPU 20 moves to step 148. In a case in which the first shake time is equal to or less than Δt1, the processing returns to step 142 without detecting the motion as shaking and continues observing the motion components A.

In step 148, the CPU 20 determines whether or not a second shake time (period) is less than a predetermined time period Δt2. In a case in which the motion component has exceeded the threshold value Thu before the threshold value Thd as shown in FIG. 16A, the second shake time is the period from the time when the motion component has exceeded the threshold value Thu until the time when the motion component becomes a value within the predetermined range after having exceeded the threshold value Thd. In a case in which the motion component has exceeded the threshold value Thd before the threshold value Thu as shown in FIG. 16B, the second shake time is the period from the time when the motion component has exceeded the threshold value Thd until the time when the motion component becomes a value within the predetermined range after having exceeded the threshold value Thu. Further, Δt2 represents a shake valid time (period) and is a predetermined period for ensuring that the CPU 20 does not detect motion as shaking in a case in which the second shake time exceeds Δt2. This is because in shaking intended for motion inputting, the second shake time strongly tends to fall within the certain predetermined period, but in a case in which the second shake time exceeds Δt2, the potential for the motion to be unintended motion including when the user boards a means of transportation, walks, runs, and so forth is high. In a case in which the second shake time is less than Δt2, the processing proceeds to step 150. In a case in which the second shake time has exceeded Δt2, the processing returns to step 142 without detecting the motion as shaking and continues observing the motion components A.

The first shake time and the second shake time may be counted by a timer or may be calculated from the number of measurements of the motion components a within the shake times.

In step 150, the CPU 20 determines whether or not a vector integral value within the second shake time has exceeded a determination threshold value ΔTh. The vector integral value is the integral value of the magnitude of the motion component A that has been detected within the second shake time and corresponds to the hatched portions shown in FIG. 16A and FIG. 16B. Further, ΔTh is a determination threshold for ensuring that the CPU 20 does not detect motion as shaking in a case in which the vector integral value within the second shake time is equal to or less than ΔTh on the basis of the fact that the vector integral value within the second shake time tends to be smaller than normal when the user boards a means of transportation, walks, runs, and so forth. In a case in which the vector integral value within the second shake time has exceeded ΔTh, the processing proceeds to step 152. In a case in which the vector integral value within the second shake time is equal to or less than ΔTh, the processing returns to step 142 without detecting the motion as shaking and continues observing the motion components A.

In step 152, the CPU 20 stores in a predetermined storage region as the shaking detection results the axial direction corresponding to the largest motion component A that was determined to have exceeded the threshold value Thu or the threshold value Thd in step 142, the first shake time, the second shake time, and the vector integral value within the second shake time. With respect to the axial direction, the CPU 20 determines whether the shaking direction is the positive direction or the negative direction of that axis depending on which of the threshold value Thu and the threshold value Thd the largest motion component A has first exceeded. In a case in which the largest motion component A has first exceeded the threshold value Thu as shown in FIG. 16A, the CPU 20 determines that the shaking direction is the positive direction. In a case in which the largest motion component A has first exceeded the threshold value Thd as shown in FIG. 16B, the CPU 20 determines that the shaking direction is the negative direction.

Next, the processing returns to step 106 of FIG. 9 and generates and outputs a detection signal on the basis of the detection result that was stored in step 152 of the shaking detection processing (FIG. 14).

For example, the motion detection device 10 of the present exemplary embodiment may be disposed in a mobile telephone in such a way that the positive direction on the X-axis is up in the lengthwise direction of the mobile telephone, the negative direction on the X-axis is down in the lengthwise direction, the positive direction on the Y-axis is left in the width direction of the mobile telephone, the negative direction on the Y-axis is right in the width direction, the positive direction on the Z-axis is back in the thickness direction of the mobile telephone, and the negative direction on the Z-axis is front in the thickness direction.

The various input operations and the directions of shaking can be associated with one another in such a way that shaking in the left direction turns the volume up, shaking in the right direction turns the volume down, shaking in the front direction changes (backward) One Seg channels, shaking in the back direction changes (forward) One Seg channels, shaking in the down direction moves to the next page of the address book, shaking in the up direction returns to the previous page of the address book, and so forth. Consequently, in step 106, the CPU 20 outputs a detection signal according to these associations. For example, in a case in which the detection result is the positive direction on the Y-axis, a detection signal instructing an operation input to increase the volume is outputted.

Further, plural determination times (periods) or determination threshold values may also be set with respect to the first shake time, the second shake time, and the vector integral value within the second shake time, and a detection signal indicating the degree of an input operation may be output based on whether the first shake time, the second shake time, or the vector integral value within the second shake time exceed any of these determination times or determination threshold values. For example, for outputting a detection signal indicating that the volume is to be turned up or down, Δt11 and Δt12 (Δt1<Δt11<Δt12) can be set as determination times with respect to the first shake time, and the CPU 20 can output a detection signal indicating that the volume is to be turned up or down by one level if the shake time is equal to or less than Δt11, by two levels if the shake time is between Δt11 and Δt12, and by three levels if the shake time is equal to or greater than Δt12.

As described above, according to the motion detection device of the present exemplary embodiment, the motion detection device separates as the stationary components the data after the low-pass filter processing of the acceleration component data acquired from the triaxial acceleration sensor, separates as the motion components the data obtained by subtracting the data of the stationary components from the acquired acceleration component data, determines the axis having the largest stationary component to be the gravity axis, and, if the motion component of the largest motion components of the three axes that has first exceeded the threshold value Thu or the threshold value Thd is on an axis other than the gravity axis, performs detection of motion as shaking. Thereby, the motion detection device can reduce misdeterminations resulting from unintended vibration in the direction of gravity, which easily occurs when the user boards a means of transportation, walks, runs, and so forth, and can accurately detect, by simple processing, an axial direction of the motion axis of the shaken motion detection device.

Further, the motion detection device uses the first shake time, the second shake time, and the vector integral value within the second shake time to determine whether the change in the motion components is due to unintended vibration or whether the change in the motion components should be detected as shaking. Therefore, the motion detection device can reduce misdeterminations resulting from unintended vibration even in a case in which the accuracy of determining the gravity axis is low.

In the above-described exemplary embodiment, a case has been described in which the motion detection device performs, as the determination of whether or not to detect motion as shaking, all of the determination of whether or not the axis is the gravity axis, the determination using the first shake time, the determination using the second shake time, and the determination using the vector integral value within the second shake time. However, the exemplary embodiment is not limited to this and may also be configured to perform only the determination of whether or not the axis is the gravity axis, or any combinations of the determination of whether or not the axis is the gravity axis and at least one of the determination resulting from the first shake time, the determination resulting from the second shake time, and the determination resulting from the vector integral value within the second shake time.

Further, in the above-described exemplary embodiment, a case has been described where the triaxial acceleration sensor and the microcomputer are integrated, but embodiments are not limited to this. An embodiment may also be configured in such a way that only the triaxial acceleration sensor is disposed inside an electronic device and the microcomputer is disposed outside the electronic device.

What is claimed is:

1. A controller comprising:
    an input unit that receives sets of acceleration component data for each axis of a three-dimensional rectangular coordinate system, the sets of acceleration component data expressing an acting acceleration;
    a separating unit that separates the sets of acceleration component data into stationary components obtained by subjecting the sets of acceleration component data to low-pass filter processing and motion components obtained by subtracting the stationary components from the sets of acceleration component data;
    a gravity axis determination unit that determines an axis whose separated stationary component is the largest to be a gravity axis; and
    a motion detection unit which, in a case in which an axis corresponding to a largest motion component showing a largest value of the separated motion components is an axis other than the determined gravity axis, detects a motion axis of the acting acceleration on the basis of the largest motion component.

2. The controller according to claim 1, wherein the motion detection unit detects, as the largest motion component, a motion component of the separated motion components that has first exceeded an upper limit value of a predetermined range including 0, or a motion component of the separated motion components that has first fallen below a lower limit value of the predetermined range.

3. The controller according to claim 2, wherein
    in a case in which the largest motion component has exceeded the upper limit value before falling below the lower limit value, the motion detection unit detects as a first time period a period from a time when the largest motion component has exceeded the upper limit value until a time when the largest motion component falls below the lower limit value,
    in a case in which the largest motion component has fallen below the lower limit value before exceeding the upper limit value, the motion detection unit detects as the first time period a period from a time when the largest motion component has fallen below the lower limit value until a time when the largest motion component exceeds the upper limit value, and
    in a case in which the first time period exceeds a first threshold value, the motion detection unit detects that the motion axis of the acting acceleration is an axial direction corresponding to the largest motion component.

4. The controller according to claim 3, wherein the motion detection unit detects magnitude of motion on the basis of the first time period.

5. The controller according to claim 2, wherein
    in a case in which the largest motion component has exceeded the upper limit value before falling below the lower limit value, the motion detection unit detects as a second time period a period from a time when the largest motion component has exceeded the upper limit value until a time when the largest motion component becomes a value within the predetermined range after having fallen below the lower limit value,
    in a case in which the largest motion component has fallen below the lower limit value before exceeding the upper limit value, the motion detection unit detects as the second time period a period from a time when the largest motion component has fallen below the lower limit value until the largest motion component becomes a value within the predetermined range after having exceeded the upper limit value, and
    in a case in which the second time period is less than a second threshold value, the motion detection unit detects that the motion axis of the acting acceleration is an axial direction corresponding to the largest motion component.

6. The controller according to claim 5, wherein the motion detection unit detects magnitude of motion on the basis of the second time period.

7. The controller according to claim 2, wherein
in a case in which the largest motion component has exceeded the upper limit value before falling below the lower limit value, the motion detection unit detects that the motion axis of the acting acceleration is an axial direction corresponding to the largest motion component if an integral value of a magnitude of the largest motion component within a third period exceeds a third threshold value, the third period being a period from a time when the largest motion component has exceeded the upper limit value until the largest motion component becomes a value within the predetermined range after having fallen below the lower limit value, and in a case in which the largest motion component has fallen below the lower limit value before exceeding the upper limit value, the motion detection unit detects that the motion axis of the acting acceleration is an axial direction corresponding to the largest motion component if an integral value of a magnitude of the largest motion component within a fourth period exceeds the predetermined third threshold value, the fourth period being a period from a time when the largest motion component has fallen below the lower limit value until the largest motion component becomes a value within the predetermined range after having exceeded the upper limit value.

8. The controller according to claim 7, wherein the motion detection unit detects magnitude of motion on the basis of the integral value of the magnitude of the largest motion component.

9. An electronic device comprising the controller according to claim 1.

10. The controller according to claim 1, wherein in a case in which the axis corresponding to the largest motion component is the gravity axis, the motion detection unit does not perform detection of a motion axis.

11. A motion detection method comprising:
receiving sets of acceleration component data for each axis of a three-dimensional rectangular coordinate system, the sets of acceleration component data expressing an acting acceleration;
separating the sets of acceleration component data into stationary components obtained by subjecting the sets of acceleration component data to low-pass filter processing and motion components obtained by subtracting the stationary components from the sets of acceleration component data;
determining an axis whose separated stationary component is the largest to be a gravity axis; and
in a case in which an axis corresponding to a largest motion component shoring a largest value of the separated motion components is an axis other than the gravity axis, detecting a motion axis of the acting acceleration on the basis of the largest motion component.

12. The motion detection method according to claim 11, further comprising detecting, as the largest motion component, a motion component of the separated motion components that has first exceeded an upper limit value of a predetermined range including 0 or a motion component of the separated motion components that has first fallen below a lower limit value of the predetermined range.

13. The motion detection method according to claim 12, wherein detecting the motion axis comprises:
in a case in which the largest motion component has exceeded the upper limit value before falling below the lower limit value, detecting as a first time period a period from a time when the largest motion component has exceeded the upper limit value until a time when the largest motion component falls below the lower limit value, in a case in which the largest motion component has fallen below the lower limit value before exceeding the upper limit value, detecting as the first time period a period from a time when the largest motion component has fallen below the lower limit value until a time when the largest motion component exceeds the upper limit value, and in a case in which the first time period exceeds a first threshold value, detecting that the motion axis of the acting acceleration is an axial direction corresponding to the largest motion component.

14. The motion detection method according to claim 13, further comprising detecting magnitude of motion on the basis of the first time period.

15. The motion detection method according to claim 12, wherein detecting the motion axis comprises:
in a case in which the largest motion component has exceeded the upper limit value before falling below the lower limit value, detecting as a second time period a period from a time when the largest motion component has exceeded the upper limit value until a time when the largest motion component becomes a value within the predetermined range after having fallen below the lower limit value, in a case in which the largest motion component has fallen below the lower limit value before exceeding the upper limit value, detecting as the second time period a period from a time when the largest motion component has fallen below the lower limit value until the largest motion component becomes a value within the predetermined range after having exceeded the upper limit value, and in a case in which the second time period is less than a second threshold value, detecting that the motion axis of the acting acceleration is an axial direction corresponding to the largest motion component.

16. The motion detection method according to claim 15, further comprising detecting magnitude of motion on the basis of the second time period.

17. The motion detection method according to claim 12, wherein detecting the motion axis comprises:
in a case in which the largest motion component has exceeded the upper limit value before falling below the lower limit value, detecting that the motion axis of the acting acceleration has moved in the axial direction corresponding to the largest motion component if an integral value of a magnitude of the largest motion component within a third period exceeds a third threshold value, the third period being a period from a time when the largest motion component has exceeded the upper limit value until the largest motion component becomes a value within the predetermined range after having fallen below the lower limit value, and in a case in which the largest motion component has fallen below the lower limit value before exceeding the upper limit value, detecting that the motion axis of the acting acceleration has moved in the axial direction corresponding to the largest motion component if an integral value of a magnitude of the largest motion component within a fourth period exceeds the predetermined third threshold value, the fourth period being a period from a time when the largest motion component has fallen below the lower limit value until the largest motion component becomes a value within the predetermined range after having exceeded the upper limit value.

18. The controller according to claim 17, wherein the motion detection unit detects magnitude of motion on the basis of the integral value of the magnitude of the largest motion component.

19. A non-transitory storage medium storing a program causing a computer to execute motion detection processing, the motion detection processing comprising:
   receiving sets of acceleration component data for each axis of a three-dimensional rectangular coordinate system, the sets of acceleration component data expressing an acting acceleration;
   separating the sets of acceleration component data into stationary components obtained by subjecting the sets of acceleration component data to low-pass filter processing and motion components obtained by subtracting the stationary components from the sets of acceleration component data;
   determining an axis whose separated stationary component is the largest to be a gravity axis; and
   in a case in which an axis corresponding to a largest motion component shoring a largest value of the separated motion components is an axis other than the gravity axis, detecting a motion axis of the acting acceleration on the basis of the largest motion component.

\* \* \* \* \*